Jan. 10, 1950 C. E. TORSCH 2,494,459

CATHODE-RAY BEAM DEFLECTOR

Filed Nov. 9, 1945

INVENTOR
Charles E. Torsch
BY Oliver A. Mitchell
ATTORNEY

Patented Jan. 10, 1950 2,494,459

UNITED STATES PATENT OFFICE 2,494,459

CATHODE-RAY BEAM DEFLECTOR

Charles Edward Torsch, Lancaster Township, Lancaster County, Pa., assignor to Radio Corporation of America, a corporation of Delaware Application November 9, 1945, Serial No. 627,752

1 Claim. (Cl. 250—157)

Figure 1:
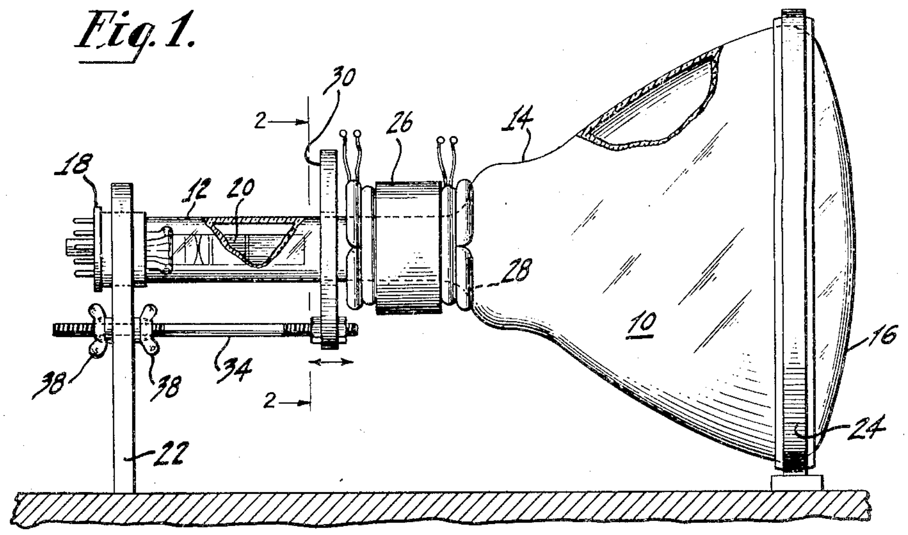

This invention relates to an improvement in television equipment, and, in more particularity, to the manner in which the degree of deflection of the cathode ray beam is controlled or varied in a cathode ray tube under the control of electromagnetic deflection systems. The present invention is adapted for use with any type tube where a cathode ray beam is employed and in which the beam is deflected electromagnetically. The principal use of the present invention, however, is in connection with television receivers wherein it is possible to alter the size of the scanned raster or pattern without in any way shifting the position of the deflecting yoke with respect to the cathode ray tube and without altering, by usual means well known in the art, the current or voltage variations that are applied to windings of the deflecting yoke.

In television receivers it is desirable that some means be provided whereby the extent or amplitude of both the horizontal and vertical deflections of the cathode ray beam may be controlled in order thereby to alter the size of the raster scanned by the cathode ray beam. This variation in the size of the raster has been controlled by one or another of two expediences. One of these is the provision of a means for altering the peak-to-peak output of the deflection generators and the other is in the provision of means whereby the position of the deflecting yoke may be altered along the tube neck to shift the deflection region closer to or farther from the electron gun structure. Either of these two methods will, under certain circumstances, afford the necessary adjustment. However, each method of the prior art also has certain objections.

It is preferable not to alter the output from the deflection generators since frequently a change in the output level affects the linearity of deflection and, once the generators have been adjusted for efficient output and for good linearity, it is desirable not to disturb this adjustment. It is, therefore, the practice in some television receivers to adjust both the horizontal and vertical deflection generators for efficient and linear output and to apply this output to the windings of the deflecting yoke. Thereafter no further adjustments are made in the deflection generators and the size of the scanned raster is altered by shifting the position of the deflecting yoke relative to the cathode ray tube. Assuming the deflection generators were so adjusted as to give the proper aspect ratio, this ratio would be maintained regardless of the position of the yoke, and, if the yoke were moved in the direction of the electron gun structure, the area of the raster would be increased whereas, if the yoke were moved in the opposite direction (i. e. toward the screen of the tube) the size of the raster would be reduced.

This latter method of adjusting the size of the scanned raster is satisfactory for narrow angle deflection tubes, however, certain difficulties arise when the same adjusting facilities are applied to a wide angle cathode ray tube in which the cathode ray beam is deflected over approximately a 55° angle. In the wide angle tube, considerable difficulty has been experienced in that when the yoke is moved in the direction of the electron gun structure to increase the size of the raster, the beam frequently strikes the area of the tube where the neck or cylindrical portion joins the conical portion of the tube. Naturally, if the electron beam strikes this or any other portion of the tube intermediate the gun and the screen, a shadow is cast on the screen of the tube. Cathode ray beam bombardment of the glass at the neck splice (which produces the shadow) is detrimental to the glass tube wall. Local heating of the glass results, increasing its conductivity. Heating of the conductive coating constituting the second anode within the neck will frequently evolve gases which will then contribute to poorer focus and "ion spot" burn effects. When using the wide angle cathode ray tube, it is, therefore, desirable to position the deflecting yoke as close to the conical portion of the tube as is physically possible in order to preclude any possibility of the beam striking a portion of the glass envelope in the region of the junction of the neck and conical portions of the tube.

In accordance with the present invention, an electromagnetic deflecting yoke is positioned on the neck of the tube and as far from the electron gun structure as is mechanically possible. The deflection generators are then adjusted such that a maximum area on the screen of the tube is covered with reasonable assurance that no larger area would need be traversed. In order to reduce the size of the scanned pattern or raster, the deflection yoke is not moved (since it is always as close to the conical portion of the tube as it can be positioned) but, instead, a magnetic shunt is positioned between the deflecting yoke and the electron gun structure so as to form a shunt path for a portion of the deflection field produced by the yoke thereby reducing the effect of the field with the result that the size of the scanned pattern or raster is reduced. If the magnetic shunt is brought close to the base end of the deflecting yoke, the size of the raster is further reduced and this reduction in area is proportionate in all directions. When a raster of the desired area is obtained, the magnetic shunt is then locked in position and no further adjustments are necessary.

It is, therefore, one purpose of the present invention to provide a means, associated with the cathode ray tube, whereby the degree of deflection of the cathode ray beam generated therein may be altered without disturbing the adjustments controlling the output from the deflection generator and without shifting or altering the position of the deflecting yoke relative to the cathode ray tube.

Another purpose of the present invention resides in the provision of magnetic shunt associated with the electromagnetic deflecting coil or yoke of a cathode ray tube whereby it is possible to alter the size of the scanned raster without disturbing the adjustments controlling the deflection generators and without shifting the position of the yoke relative to the tube.

Still another purpose of the present invention resides in the provision of means whereas it is possible to position an electromagnetic deflecting yoke in a desirable position relative to the cathode ray tube and to retain the yoke in that position with magnetic shunting means associated with the yoke for altering the area of the scanned raster.

Other purposes and advantages of the present invention will become more apparent to those skilled in the art from the following detailed description particularly when considered in connection with the drawings, wherein:

Figure 1 represents one form of the present invention; and

Figure 2:
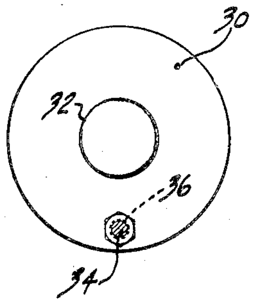

Figure 2 presents the detailed construction of the electromagnetic shunt.

Referring now to the drawings and more particularly to Figure 1 thereof, there is shown a cathode ray tube 10 which includes a neck or tubular portion 12 and a somewhat conical portion 14. The inside wall of the end 16 of the tube is, in most cases, coated with a fluorescent material in order to respond to the impinging cathode ray beam while the opposite end of the tube is provided at a socket 18 to which connections may be made for energizing an electron gun represented generally at 20.

The cathode ray beam may be supported in any appropriate manner as, for example, by a support post 22 at the base end of the tube and by a clamp ring 24 at the viewing screen end of the tube.

The electromagnetic deflecting yoke 26 includes both the horizontal and vertical deflecting coils, and, although the exact construction of the yoke is immaterial insofar as the present invention is concerned, the yoke may be made in the manner shown and described, for example, in Torsch United States patent application, Serial No. 575,369, filed January 31, 1945 and issued October 14, 1947 as Patent 2,428,947 or in Grundmann United States patent application, Serial No. 538,006, filed January 30, 1944 and issued February 26, 1946 as Patent 2,395,736. The ends of the coils of the deflection yoke are compactly arranged and the end of the yoke adjacent the conical portion 14 of the tube 11 is preferably shaped so as to fit closely adjacent the junction 28 between the cylindrical portion 12 and the conical portion 14. Once the deflecting coil is placed in this position it is held there by any apropriate means.

The present invention also includes a magnetic shunt 30 which is in the form of an annulus and is preferably made of silicon steel, powdered iron (sintered) or some other magnetic material preferably of high permeability. The diameter of the aperture 32 in the magnetic shunt is preferably slightly larger than the diameter of the tube neck 12 in order that it may be readily and easily moved along the neck of the tube. The outside diameter of the magnetic shunt is more or less immaterial but should be in excess of the outside diameter of the deflection yoke.

To adjustably support the magnetic shunt, a support rod 34 may be provided and this rod may be attached to the shunt ring by providing a small hole 36 near the periphery of the magnetic shunt in order that the support rod 34 may be attached thereto by threaded nuts or in any other appropriate manner.

For adjusting the size of the scanned raster, the electromagnetic shunt is moved nearer to or further from the deflecting yoke and after the desired pattern size is obtained, the magnetic shunt is retained in that position by anchoring the support rod to the support bracket or post 22. Wing nuts, cooperating with the threaded end of the support rod, permit anchoring the magnetic shunt in the desired position.

When the magnetic shunt 30 is removed from the vicinity of the deflecting yoke, the maximum effect of the yoke is present and the cathode ray beam is deflected to cover a maximum raster. Since the yoke is positioned immediately adjacent the conical portion 14 of the cathode ray tube, the possibility of the cathode ray beam striking the portion 28 of the tube is minimized. This is not the situation, however, where maximum deflection is produced by moving the yoke toward the electron gun structure since in so doing the deflected cathode ray beam may impinge against the portion 28 of the tube rather than the screen. With the yoke in the position shown in the drawing and with a maximum raster scanned on the screen of the tube, the size of the raster may be reduced in all dimensions proportionately by moving the magnetic shunt 30 more adjacent the deflecting yoke. A certain amount of electromagnetic field extends outside the physical confines of the deflecting yoke and as soon as the plane of the magnetic shunt (which should be kept normal to the axis of the tube) comes within this field, the effect of the field produced by the yoke is reduced since a part of the flux, rather than penetrating the neck portion of the tube to assist in deflecting the beam, traverses the high permeability magnetic shunt. As the shunt is brought closer to the deflecting yoke, more of the deflection field is intercepted by the shunt 30 with the result that the field effective to produce a deflection of the cathode beam is reduced. Accordingly, the size of the scanned pattern is proportionately reduced. As the shunt is brought to bear against the rear end of the deflecting yoke, a scanning raster of materially reduced proportions will result. At some intermediate point the size of this scanned pattern will correspond to the desired raster. When the shunt is anchored at this intermediate point the proper degree of deflection of the cathode ray beam will result.

Through the use of the magnetic shunt 30, the effective length of the electromagnetic deflecting field may be controlled and, furthermore, the intensity and distribution of the deflecting field may be altered. These changes (amounting to possibly 10%) are instrumental in altering the degree of deflection to which the cathode ray beam is deflected with the result that the size of the scanned raster may be controlled.

If, without employing the shunt disc, a given raster size results in a shadowed corner when the cathode ray beam strikes the tube neck splice area, the same size raster may be retained with reduction or complete elimination of the shadowed corner by using the shunt disc as previously described. A slight increase in the power input to both deflecting coils is sometimes necessary when the disc is coupled more tightly to the stray field at the rear of the yoke. Simultaneously shortening the deflecting field and increasing applied power can be balanced for constant raster size, the shortening of the field being the significant factor in reduction of corner shadows due to the beam striking the glass neck to cone splice.

By means of the present invention, it is, therefore, apparent that the size of the raster scanned by the cathode ray beam which is electromagnetically deflected, may be altered by proper selection of the position of magnetic shunt associated with the electromagnetic deflecting yoke of the cathode ray tube. Such an expedience may be applied to any cathode ray tube (such as the Iconoscope, Kinescope, and so forth) and, in fact, any tube where electromagnetic deflection is employed. The invention is very conveniently applied to television receivers and affords a simple adjustment means for altering the size of the produced image without in any way affecting the linearity of deflection, the aspect ratio, or the efficiency of the deflection generators. The use of the magnetic shunt also minimizes possibility of the cathode ray beam striking a portion of the tube envelope thereby producing an undesired shadow on the target or scanned surface of the cathode ray tube.

I claim:

An apparatus for altering the size of the scanned raster on the viewing screen of a television image producing tube wherein a cathode ray beam is generated and wherein electromagnetic deflection is employed comprising an electromagnetic deflection yoke positioned around a portion of the cathode ray tube for deflecting the cathode ray beam in substantially mutually perpendicular directions when appropriate current variations are applied thereto to produce electromagnetic deflection fields substantially normal to each other and substantially normal to the axis of symmetry of the tube, a magnetic shunt in the form of an annulus of high permeability surrounding the cathode ray tube and positioned adjacent that end of the deflection yoke that is nearest the source of the cathode ray beam, means for adjusting the position of the magnetic annulus along the axis of the tube and with respect to the end of the deflection yoke whereby the effective intensity of the produced electromagnetic deflection fields may be altered in like proportion to thereby alter the size of the scanned raster, and means for securing the magnetic annulus in a desired position relative to the deflection yoke.

CHARLES EDWARD TORSCH.

REFERENCES CITED

The following references are of record in the file of this patent:

UNITED STATES PATENTS

| Number | Name | Date |
|---|---|---|
| Re. 22,009 | Farnsworth | Jan. 20, 1942 |
| 2,047,020 | Flaherty | July 7, 1936 |
| 2,185,857 | Lubszynski | Jan. 2, 1940 |
| 2,228,402 | Reichel et al. | Jan. 14, 1941 |
| 2,442,975 | Grundmann | June 8, 1948 |

FOREIGN PATENTS

| Number | Country | Date |
|---|---|---|
| 472,165 | Great Britain | Sept. 13, 1937 |